United States Patent [19]

Buchanan et al.

[11] 4,170,503
[45] Oct. 9, 1979

[54] WHITE SIDEWALL TIRE

[75] Inventors: Jack W. Buchanan, Stow; Daniel J. Lindner, North Canton, both of Ohio

[73] Assignee: The Goodyear Tire & Rubber Company, Akron, Ohio

[21] Appl. No.: 836,454

[22] Filed: Sep. 26, 1977

Related U.S. Application Data

[63] Continuation of Ser. No. 625,412, Oct. 20, 1975, abandoned.

[51] Int. Cl.$^2$ ............................................. B29H 17/00
[52] U.S. Cl. .............................. 156/116; 152/353 R; 152/DIG. 12
[58] Field of Search ................... 156/111 R, 116, 123; 152/353 R, DIG. 12

[56] References Cited

U.S. PATENT DOCUMENTS

| | | | |
|---|---|---|---|
| 1,448,286 | 3/1923 | Comstock | 152/DIG. 12 |
| 1,784,118 | 12/1930 | Smithers | 152/DIG. 12 |
| 1,940,077 | 12/1933 | Coe | 152/DIG. 12 |
| 2,572,259 | 10/1951 | Gottschall | 152/DIG. 12 |
| 2,761,489 | 9/1956 | Kroft | 152/353 |
| 3,452,799 | 7/1969 | Hindin | 152/353 |
| 3,769,123 | 10/1973 | Botts et al. | 156/116 |

Primary Examiner—John E. Kittle
Attorney, Agent, or Firm—R. S. Washburn

[57] ABSTRACT

Using a decor strip of white, or other contrasting, compound not greater than about 2 millimeters thickness, two ribs and an intervening annular groove lined with the strip are formed on a tire sidewall. The strip is cured integrally with the ribs and sidewall and in direct contact with the mold, without the customary overlay of black rubber. The tire so formed has no white rubber beneath any black rubber in the tire. The quantity of white compound required is materially reduced.

The foregoing abstract is not to be taken as limiting the invention of this application, and in order to understand the full nature and extent of the technical disclosure of this application, reference must be made to the accompanying drawing and the following detailed description.

3 Claims, 4 Drawing Figures

WHITE SIDEWALL TIRE

This is a continuation, of application Ser. No. 625,412, filed Oct. 20, 1975, now abandoned.

The present invention relates to the manufacture of tires and particularly to the manufacture of a tire having a decor strip providing a tire of the type commonly known as a white sidewall tire.

The objects of the invention are an improved white sidewall tire and a method of making such tire at less cost.

Broadly, the invention comprises a tire having a white decor strip displayed circumferentially on one sidewall, said tire comprising a pair of ribs formed integrally with said one sidewall to extend circumferentially of the tire and outwardly of the sidewall to define an annular groove between said ribs, a strip of white rubber compound not greater than 2 millimeters thick conforming to said groove and molded and cured therein integrally with the tire, said strip having circumferential edges terminating the strip flush with the outwardly exposed surfaces of the respective ribs, the mold contact surface of said one sidewall being removed only from said edges and said surfaces.

In a further aspect, the invention comprises the method of making a tire having a white sidewall comprising disposing a thin strip of white rubber compound circumferentially about the external surface of the sidewall region of the tire in its uncured state, placing the uncured tire in a tire curing mold with said thin strip exposed to direct contact with the mold, in the mold displacing relatively of each other an intermediate portion of the width of the strip inwardly and respective margins of the width of the thin strip outwardly in directions normal to the contour of the sidewall region to form in said strip between said intermediate portion and each of said margins a wall extending normal to the sidewall region contour and circumferentially of said region, curing and removing the tire from the mold, and removing said margins and an outward portion of each wall.

To acquaint those skilled in the related arts more fully with the concept and practice of the invention, a preferred embodiment illustrating the best mode of implementation thereof will be described with reference to the attached drawings forming a part of this specification and in which drawings.

Figure 1:
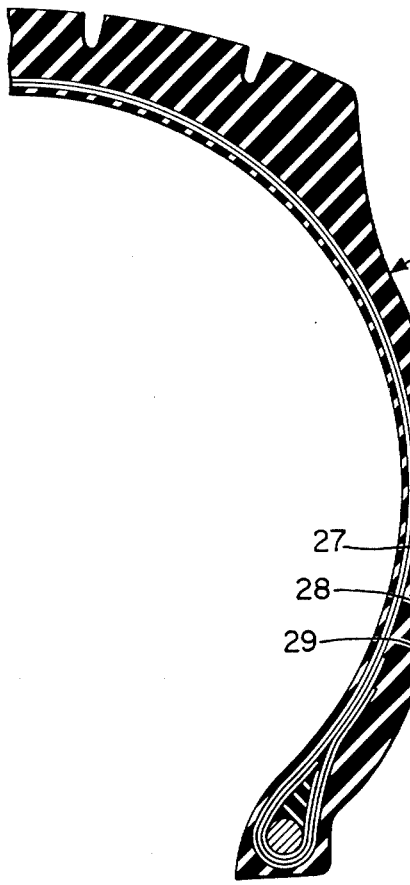
FIG. 1 is a partial view in axial cross-section, and in approximately full scale, of a tire in accordance with the invention.
Figure 2:
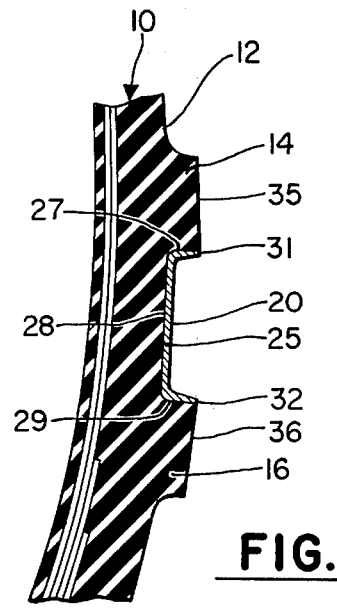
FIG. 2 is a view of a portion of FIG. 1, enlarged in scale.

A tire 10 in accordance with the invention and illustrated in FIGS. 1 and 2 comprises, in the sidewall region 12 of the tire, a pair of ribs 14,16 which extend circumferentially of the tire and define therebetween an annular groove 20 which has a strip 25 of white rubber compound overlying the surfaces 27,28,29 of the groove and molded and cured therein integrally with the tire 10.

The arrangement provides two notable advantages. First, the white rubber strip is no more than about 2 millimeters in thickness, thereby minimizing the quantity of white rubber compound required to provide a decorative white sidewall. Secondly, the respective ribs 14,16 and the underlying sidewall, of conventional black rubber compound, are completely free of any white material therein. This prevents the accidental spoiling of the appearance of the tire by scuffing of the respective ribs. The elevation of the ribs with respect to the white strip 25 in the groove 20 satisfactorily protects the white surface from staining or discoloration.

The white strip lying within the groove is turned outwardly of the tire along the respectively adjacent surfaces 27,29 of the adjoining ribs so that the respective edges 31,32 of the strip lie flush with the outward surfaces 35,36 of the respective ribs.

Figure 3:
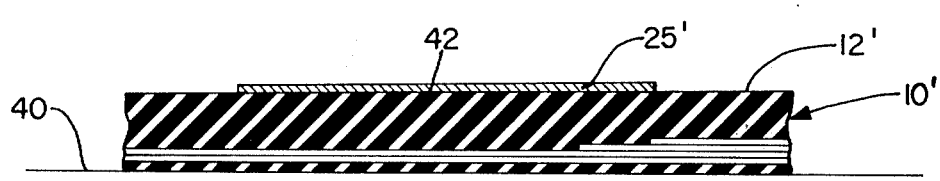
FIG. 3 and FIG. 4 are views schematically illustrating steps in the process of making the tire of FIG. 1.

FIG. 3 illustrates a portion of the sidewall region 12' of an uncured tire 10' disposed on a tire building surface 40 and having the customary black rubber compound of the sidewall overlying the cord plies of the tire. The numeral 10' identifies the tire in process from the finished tire 10. Likewise, the "prime" distinguishes parts of the uncured tire 10' from like parts of the cured tire 10. A thin strip 25' of white rubber compound is disposed circumferentially about the exterior surface 42 of sidewall region 12' and is conventionally spliced to form an endless white band about the uncured tire which is in generally cylindrical form.

The uncured tire 10' is then removed from the building surface 40 and placed in a tire curing mold (not shown) with the thin strip 25' of white rubber compound exposed to direct contact with the mold.

Figure 4:
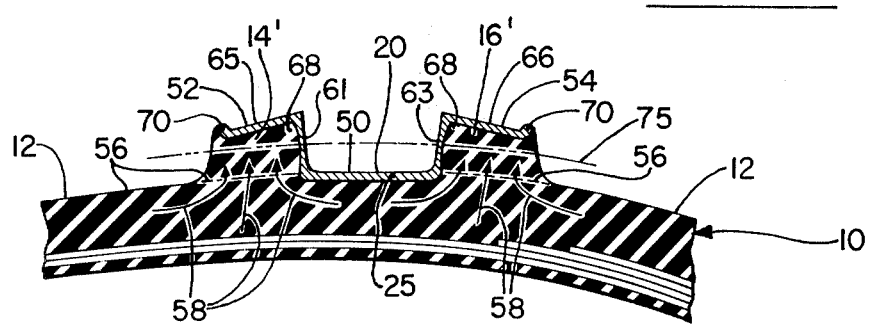

In the mold, as illustrated in FIG. 4, the intermediate portion 50 of the width of the strip 25; i.e. that portion overlying the bottom 28 of the groove 20, and the respective margins 52,54 thereof are displaced relative to each other in directions normal to the contour (indicated by the line 56) of the sidewall region 12 of the tire 10 in its inflated condition. The displacement effects a movement, suggested by the arrows 58, of the underlying black sidewall rubber compound outwardly of the contour 56 to form the pair of ribs 14,16. The movement of the black sidewall rubber relative to the white rubber strip 25 particularly along walls 27 and 29 tends not only to form the strip walls 61,63 between the intermediate portion 50 and the margins 52,54 but to cause these walls of the strip to become thinner as the movement progresses. This thinning effect is increased by forming the ribs 14,16 with surfaces 65,66 inclined respectively from a peak 68 adjacent to the groove 20 and inwardly toward the sidewall contour.

Also, in accordance with the invention, the flow stop ridges 70 about semi-circular in cross-section outline and having a radius of about 1 millimeter serve to prevent the respective white strip margins from flowing, during molding, beyond the respective ridges. The surfaces 65,66 of the ribs are inclined inwardly from the peaks 68 at angles of from 5 to 30 degrees. This arrangement permits the formation of the peak 68 to augment the thinning effect desired in the respective walls 61,63 without increasing the black rubber required.

The width of the respective ribs 14,16, measured radially of the tire, allows considerable tolerance in the width of the white strip as well as in its location radially of the tire. Thus, the respective edges of the strip 25, after molding, as seen in FIG. 4, may terminate between the flow stop ridge 70 and the approximate midpoint of the width of the inclined surface 65 or 66 of the respective ribs.

The tire, having been molded and cured, is removed from the mold and is then mounted and inflated. The margins 52,54 of the white strip and portions of the ribs 14,16 are then removed, outwardly of a buffing line 75 inward of the respective margins of the white strip and passing through respective intermediate portions of the respective walls. Thus, each margin of white is removed and an outward portion of each wall 61,63 is also removed. The buffing line 75 may be arranged to generally parallel the contour 56 of the sidewall region. With no loss of appearance in the finished tire, the buffing line can be a straight line which is more readily formed by the cylindrical surface of a conventional buffing wheel.

The present invention provides a number of advantages. In particular, the use of the thin strip of white compound requires a materially smaller amount of relatively high-cost white material. Moreover, the entire outward surface of the white rubber compound is exposed and no white material is buried in the sidewall or otherwise covered. Hence, there is no risk that additional white may be accidentally exposed by minor damage to a tire thereby rendering the surface appearance thereof unsatisfactory.

Because the location of the thin white strip can be seen throughout the process instead of being hidden beneath an overlying black rubber material, a mislocation of the white can be seen and corrected before the cost of succeeding operations is incurred. The structural integrity of the underlying sidewall is not affected by the presence therein of white rubber compound.

The surface finish of the thin white strip is provided by its direct contact with the tire curing mold and except for the very thin edges of the strip which terminate flush with the finished ribs, the surface is not roughened or made porous by buffing operations.

While certain representative embodiments and details have been shown for the purpose of illustrating the invention, it will be apparent to those skilled in the art that various changes and modifications may be made therein without departing from the spirit or scope of the invention.

We claim:

1. The method of making a tire having a white sidewall comprising disposing a thin strip of white rubber compound circumferentially about the external surface of the sidewall region of the tire in its uncured state, placing the uncured tire in a tire curing mold with the thin strip exposed to direct contact with the mold, in the mold displacing relatively of each other an intermediate portion of the width of the thin strip inwardly and respective margins of the width of the thin strip outwardly in directions normal to the sidewall region to form in said strip between said intermediate portion and each of said margins a wall of substantially diminished thickness relative to said intermediate portion extending normal to the sidewall region contour and circumferentially of said region, curing and removing the tire from the mold, and removing an outward portion of each wall.

2. A method as claimed in claim 1, further comprising displacing portions of the tire sidewall underlying said margins concurrently with displacement of said margins thereby to stretch and thin each said wall and to form ribs carrying the respective margins outwardly with respect to the intermediate portion.

3. The method of making a tire having a white sidewall comprising disposing a thin strip of white rubber compound circumferentially about the external surface of the sidewall region of the tire in its uncured state, placing the uncured tire in a tire curing mold with the thin strip exposed to direct contact with the mold, in the mold displacing relatively to each other an intermediate portion of the width of the thin strip inwardly and respective margins of the width of the thin strip outwardly in directions normal to the sidewall region to form in said strip between said intermediate portion and each of said margins a wall of substantially diminished thickness relative to said intermediate portion extending normal to the sidewall region contour and circumferentially of said region, displacing portions of the tire sidewall underlying said margins concurrently with displacement of said margins thereby to stretch and thin each said wall and to form ribs carrying the respective margins outwardly with respect to the intermediate portion, and forming a flow stop ridge circumferentially of the tire on the surface of at least one of said ribs to inhibit mold flow of said margins outwardly along the surface of the respective rib away from said groove, curing and removing the tire from the mold, and removing an outward portion of each wall.

* * * * *